(12) United States Patent
Gurreri et al.

(10) Patent No.: US 7,118,286 B2
(45) Date of Patent: Oct. 10, 2006

(54) CONNECTOR AND RECEPTACLE CONTAINING A PHYSICAL SECURITY FEATURE

(75) Inventors: Michael Lawrence Gurreri, York, PA (US); Christine Anne Dooley, Lewisville, NC (US); Brian Keith Davis, Winston-Salem, NC (US); James Gregory Garrett, Lexington, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/108,489

(22) Filed: Apr. 18, 2005

(65) Prior Publication Data
US 2005/0191010 A1 Sep. 1, 2005

(51) Int. Cl.
G02B 6/38 (2006.01)

(52) U.S. Cl. .......................... 385/58; 439/680

(58) Field of Classification Search ............. 385/56, 385/58, 76, 77, 78, 85; 439/488, 677, 680
See application file for complete search history.

(56) References Cited

U.S. PATENT DOCUMENTS

| | | | | |
|---|---|---|---|---|
| 4,596,436 A | * | 6/1986 | Kraemer et al. ............. 439/701 |
| 4,746,298 A | * | 5/1988 | Hollander .................... 439/222 |
| 4,784,614 A | * | 11/1988 | Sadigh-Behzadi .......... 439/488 |
| 4,864,129 A | * | 9/1989 | Paske et al. ............. 250/269.3 |
| 5,342,221 A | * | 8/1994 | Peterson ..................... 439/677 |
| 5,729,644 A | * | 3/1998 | Shiflett et al. ................ 385/59 |
| 5,902,155 A | * | 5/1999 | Polgar et al. ............... 439/680 |
| 6,357,930 B1 | * | 3/2002 | Wiltjer ........................ 385/60 |
| 6,383,032 B1 | * | 5/2002 | Gerberding ................. 439/681 |
| 6,419,400 B1 | * | 7/2002 | Wiltjer et al. ................. 385/55 |
| 2002/0126960 A1 | | 9/2002 | Gurreri ........................ 385/76 |

* cited by examiner

Primary Examiner—Thanh-Tam Le (57) ABSTRACT

A network comprising: (a) a plurality of different receptacles for facilitating an electrical connection to different information networks requiring different access authorization, each different receptacle coupled to one and only one different information network, each receptacle having an inner surface with a first geometry, the first geometry comprising at least a slot, a certain number of receptacles having different first geometries in which the slots are in different positions; and (b) a plurality of different plugs for coupling with the different receptacles, each plug having a second geometry, the second geometry comprising at least a key in a certain position, the certain number of plugs having different second geometries in which the keys are in different positions, each different first geometry corresponding to one and only one second geometry such that the plugs and receptacles of corresponding first and second geometries are mating pairs.

18 Claims, 9 Drawing Sheets

CONNECTOR AND RECEPTACLE CONTAINING A PHYSICAL SECURITY FEATURE

CROSS REFERENCE TO RELATED APPLICATIONS

This application claims priority to U.S. Provisional Application No. 60/218,705, filed Jul. 17, 2000, U.S. application Ser. No. 09/908,140 filed Jul. 17, 2001, and U.S. application Ser. No. 10/982,374, filed Nov. 4, 2004, all of which are hereby incorporated by reference.

FIELD OF INVENTION

The present invention relates generally to connectors for use in telecommunication networks, and, more specifically, to a connector system in which only certain plugs can mate with certain receptacles to provide discriminating access to particular information networks.

BACKGROUND

A need has developed recently to limit user access in data networks for security or other purposes. Specifically, it is becoming more popular to provide buildings with a plurality of data networks, in which each network typically corresponds to a different group of authorized users. With this new development comes the need to restrict access to a particular data network to just a particular group of authorized users. While some restrictions may be achieved using software approaches, such as passwords, the applicants have identified the need to restrict access further using some type of "physical barrier" to the networks. The present invention fulfills this need among others.

SUMMARY OF INVENTION

The present invention provides a connector system which uses physical barriers to prevent unauthorized users from connecting to data networks. More specifically, the applicants recognize that the best protection against unauthorized users hacking into data networks containing confidential information is to prevent them from even connecting to the network. This can be accomplished using physical barriers which prevent plugs from mating with receptacles. To this end, the present invention facilitates discriminating mating among similar, but different, plugs and receptacles by using a system of geometrically matched connector components which allows certain combinations of plugs and receptacles—i.e., mating pairs—to mate, while preventing other combinations from mating. Thus, the connector system of the present invention imparts physical security to a particular data network by ensuring that only authorized users who possess a particular connector component can physically connect to the particular data network.

Accordingly, one aspect of the invention is a network using the connector system that provides discriminating mating between plugs and receptacles. In a preferred embodiment, the network comprises: (a) a plurality of different receptacles for facilitating an electrical connection to different information networks requiring different access authorization, each different receptacle coupled to one and only one different information network, each receptacle having an inner surface with a first geometry, the first geometry comprising at least a slot, a certain number of receptacles having different first geometries in which the slots are in different positions; and (b) a plurality of different plugs for coupling with the different receptacles, each plug having a second geometry, the second geometry comprising at least a key in a certain position, the certain number of plugs having different second geometries in which the keys are in different positions, each different first geometry corresponding to one and only one second geometry such that the plugs and receptacles of corresponding first and second geometries are mating pairs.

Another aspect of the invention is a connector system for providing discriminating mating among a family of plugs and receptacles. In a preferred embodiment, the system comprises: (a) at least a first plug and a second plug, the first plug comprising a first primary key in a first position and a first secondary slot in a first secondary position, the second plug comprising a second primary key in a second position and a second secondary slot in a second secondary position, the first and second positions being different; (b) wherein the first plug is configured to mate with a first receptacle, the first receptacle having a first primary slot in a first position and a first secondary key in a first secondary position, the first primary slot adapted to receive the first primary key and the first secondary slot adapted to receive the first secondary key to allow the first plug to mate with the first receptacle to form a mating pair; (c) wherein the second plug is configured to mate with a second receptacle, the second receptacle having a second primary slot in a second position and a second secondary key in a second secondary position, the second primary slot being adapted to receive the second primary key and the second secondary slot being adapted to receive the second secondary key to allow the second plug to mate with the second receptacle to form a mating pair; (d) wherein at least one of the first primary key interferes with the second receptacle or the second secondary key interferes with the first plug to prevent the first plug from mating with the second receptacle; and (e) wherein at least one of the second primary key interferes with the first receptacle or the first secondary key interferes with the first plug to prevent the second plug from mating with the first receptacle.

DETAILED DESCRIPTION OF PREFERRED EMBODIMENTS

Figure 1:
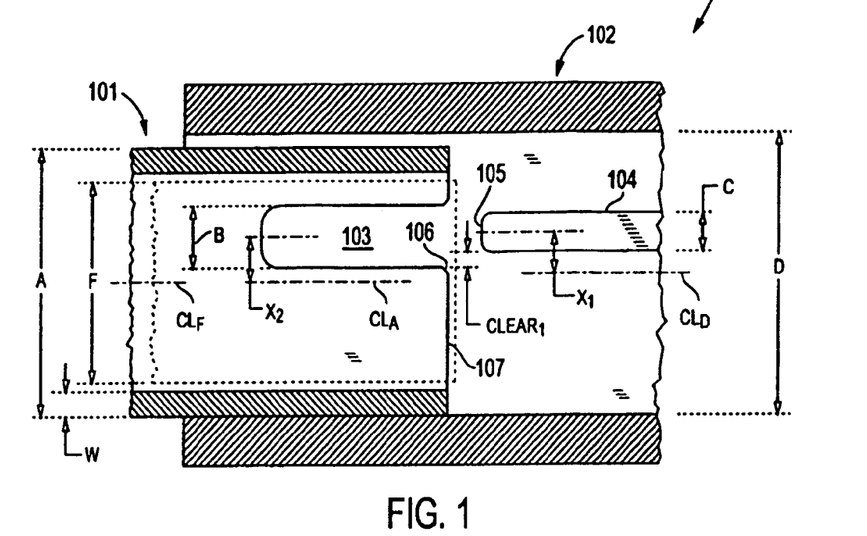
FIG. 1 shows a mating pair of the present invention in which a plug is being inserted into a receptacle.
Figure 2:
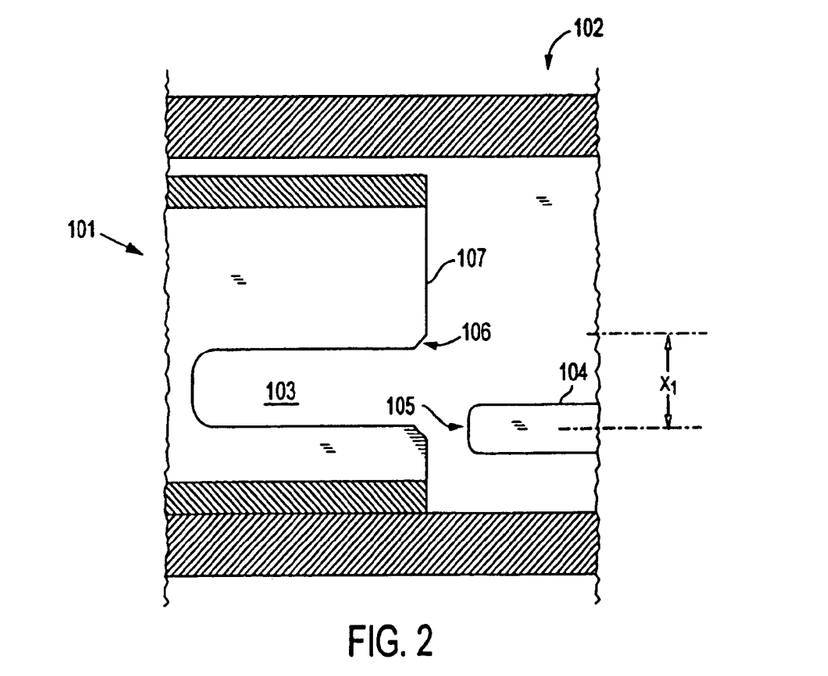
FIG. 2 shows a non-mating pair in which a plug has a slot which is not in the proper position to accept a key of a receptacle.
Figure 3:
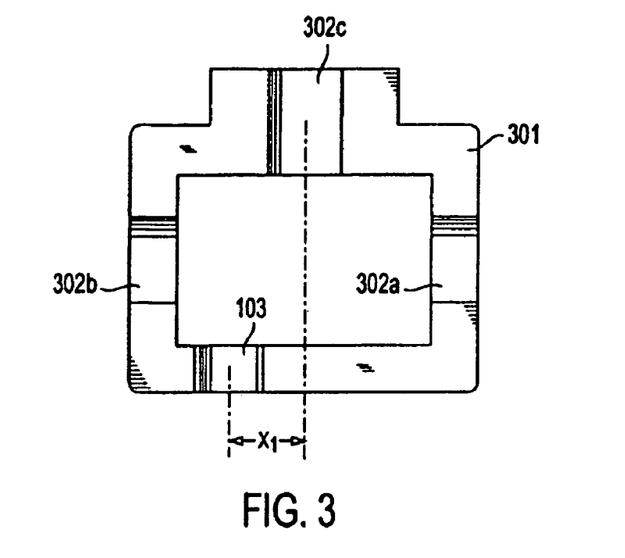
FIG. 3 shows an end view of a plug showing a slot which accepts a key of a mating receptacle.

The present invention relates to a connector system comprising plugs and receptacles which mate in a discretionary way such that only certain plugs and receptacles engage to form mating pairs. Referring to FIGS. 1–4, a preferred embodiment of the connector system 100 of the invention is shown. The connector system 100 comprises a plurality of receptacles 102 and a plurality of plugs 101, one of each is shown in FIG. 1. Each receptacle 102 has an inner surface 120 which defines a first geometry. A certain number of receptacles of the system 100 have different first geometries. Each plug 101 has an outer surface 121 which defines a second geometry in which a certain number of second geometries in the system 100 are different. Each different first geometry corresponds to one, and only one, second geometry such that the plugs and receptacles of corresponding first and second geometries are mating pairs. Therefore, the first and second geometries cooperate to allow only certain pairs of plugs and receptacles to mate (herein "mating pairs," "mating plug and receptacle," or "keyed pair"), while physically interfering for all other combinations of plugs and receptacles (herein "non-mating pairs," "non-mating plugs and receptacles" or "non-keyed pairs"), thereby preventing non-mating plugs and receptacles from effecting an optical or electrical coupling.

Aside from the variations in the first and second geometries, the plugs and receptacles of the present invention are well known optical or electrical connectors. The receptacle may be any structure having a tub to receive a plug, including, for example, a jack, an adapter for connecting two plugs together, or a connector integrated with an active device (e.g., transceiver) or passive device (e.g., splitter). The plug is received in the receptacle and typically contains a conductive element, such a fiber or conductive metal, which mates with a similar element or other optical/electrical conduit in the receptacle. For example, in electrical telecommunication applications the plug and receptacle may be a traditional RJ-type connector as defined by Title 47 (Telecommunications), Code of Federal Regulations, Chapter I (Federal Communications Commission), Subchapter B (Common Carrier Services), Part 68 (Connection of Terminal Equipment to the Telephone Network), Subpart F (Connectors), Section 68.500 (1992), herein referred to as the "RJ Standard." In fiber optic applications, the connectors may be traditional MT (such as MPO and MPX), LC, MU, SC, ST, or FC connectors.

The first and second geometries may embody any known keying mechanism that discriminates among connector components. Such keying mechanisms include, for example, a key and slot relationship between the plug and receptacle, a receptacle dimensioned to receive only certain sized or shaped plugs, and even a magnetic signature for attracting certain components (mating pairs) and repelling other components (non-mating pairs). Preferably, the keying mechanism involves just a slight modification to the plug and receptacle such that, essentially, the same molds can be used to manufacture connectors of different keyed pairs. Although molding is preferred, it is should be understood that other techniques for producing the first and second geometries can be used including, for example, overmolding and machining.

In a preferred embodiment, the invention uses a key and slot mechanism. The slot can be embodied in the first or second geometry and the key can be embodied in the other geometry. In a first configuration, the slot is embodied in the first geometry and the key is embodied in the second geometry, while in a second configuration, the key is embodied in the first geometry and the slot is embodied in the second geometry.

An embodiment of the invention having the first configuration is shown in FIGS. 1–7. Each receptacle 102 has a tub 130, which has an inner surface 120 that defines the first geometry for receiving a plug 101. In this configuration, the first geometry comprises at least one key 104. A certain number of receptacles have different first geometries in which the key 104 is in different positions. In this particular embodiment, the connector system has four different key 104 positions, although the invention is not limited to four. Likewise, each plug 101 defines a second geometry which comprises at least a slot 103 in one of four positions, although, as mentioned above, the invention is not limited to four positions.

This configuration is advantageous for a number of reasons. First, since the physical "barrier"—i.e., the key—is located on the receptacle, it will serve to facilitate discriminatory mating among, not only plugs employing security features, but also existing plugs which have no security features of the present invention. Specifically, if a slot in the plug is necessary to accommodate the key of the receptacle, then plugs without slots will not mate with receptacles having the key. Therefore, ordinary, non-secure type plugs which do not have the slot in the proper position will not mate with the receptacle. The same is not true for the second configuration. That is, in the second configuration, the physical barrier—i.e., the key—is disposed on the plug. Thus, an ordinary, non-secure type plug which does not have a key may not encounter physical interfere with a secure receptacle having a slot. Providing discriminating mating between connecters having security features and those having none is handled differently in the second configuration as discussed below. Therefore, the first configuration of the connector system tends to discriminate inherently between secure and non-secure connectors.

Figure 4:
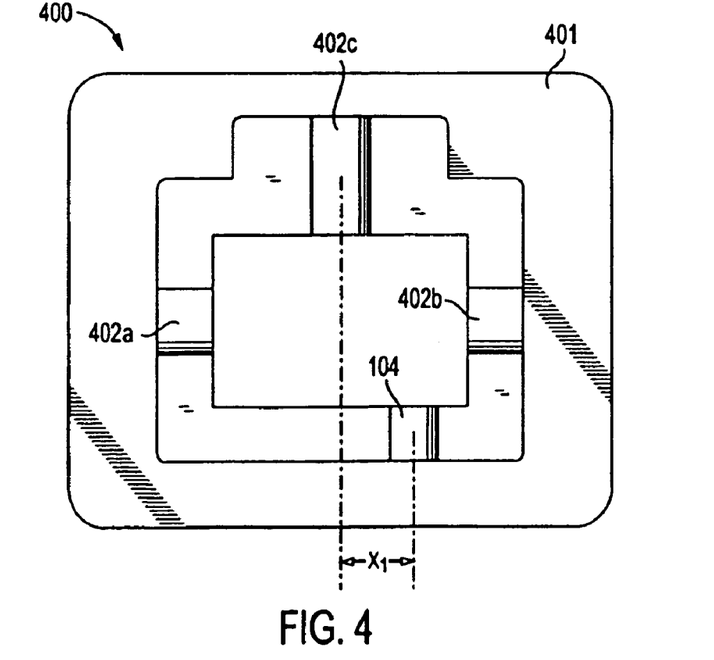
FIG. 4 shows an end view of a receptacle having a key which accepts a key of a plug of a mating pair.
Figure 5:
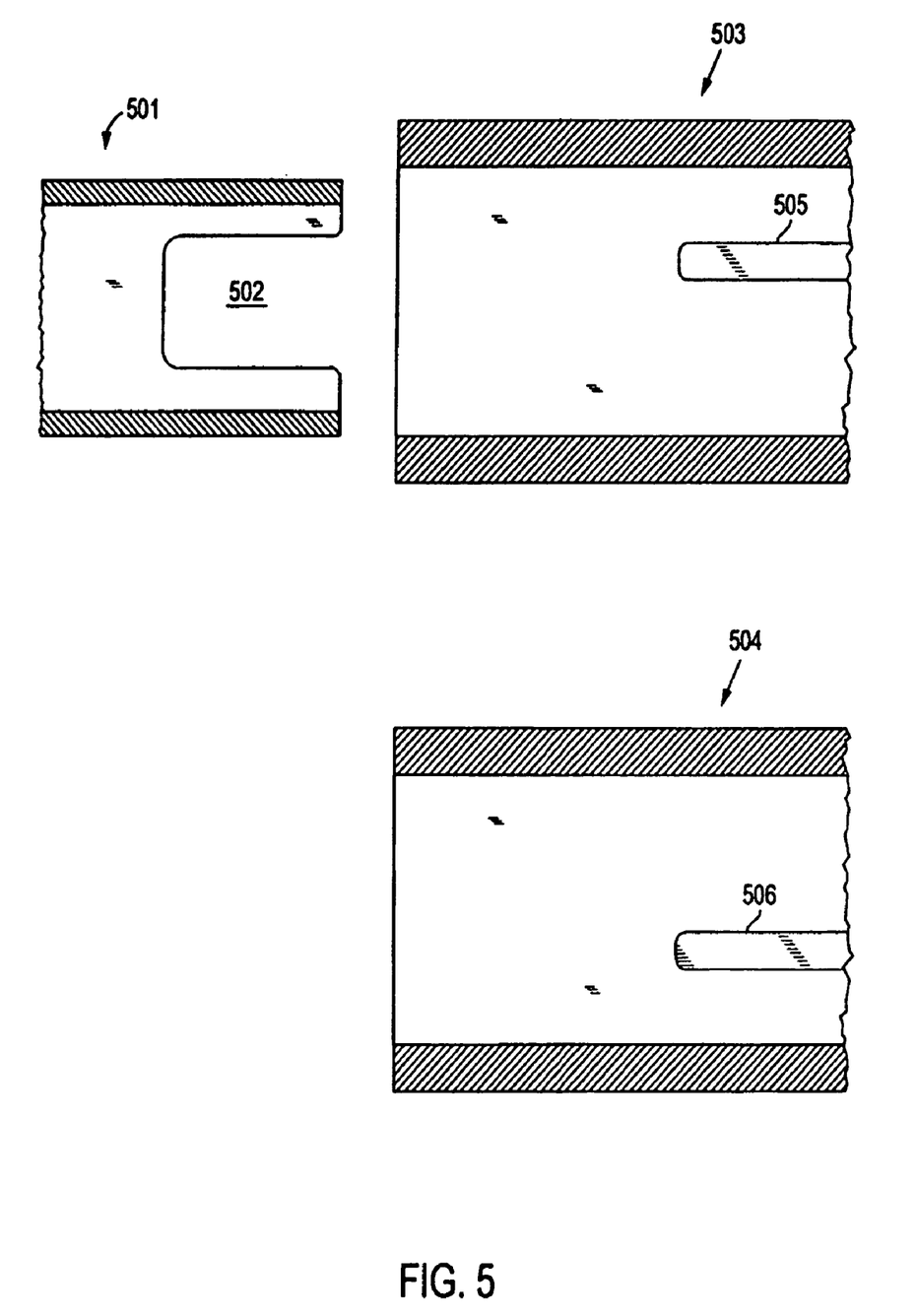
FIG. 5 shows a plug having a slot configuration capable of mating with jacks having keys in different positions.

Another benefit of the first configuration is that the key may cooperate with other "ribs" on an optical connector to pre-align a ferrule of the plug. More specifically, with particular reference to FIG. 3, which shows an end view of housing 301 of the plug 101, the housing comprises four walls with one wall having the slot 103, and the remaining three walls having secondary slots 302a, 302b, and 302c. FIG. 4 depicts an end view of housing 401 of the receptacle 400 in which the key 104 and ribs 402a, 402b, and 402c are disposed on the walls of the housing 401. The key 104 and the ribs 402a, 402b, and 402c are received by the slots 103, 302a, 302b, and 302c, respectively, to effect pre-alignment of a ferrule (not shown) with the receptacle before final mating of the plug with the receptacle. (The final mating may be achieved by precision alignment features located near the conductors, such as, for example, precision alignment pins/receiving holes on the face of the MT ferrules. Such ferrules are well known in the art.) By pre-aligning the ferrule through the synergistic use of the key and slot, the engagement of the more closely-toleranced final alignment features (e.g., alignment pins/receiving holes) is facilitated.

Figure 6A:
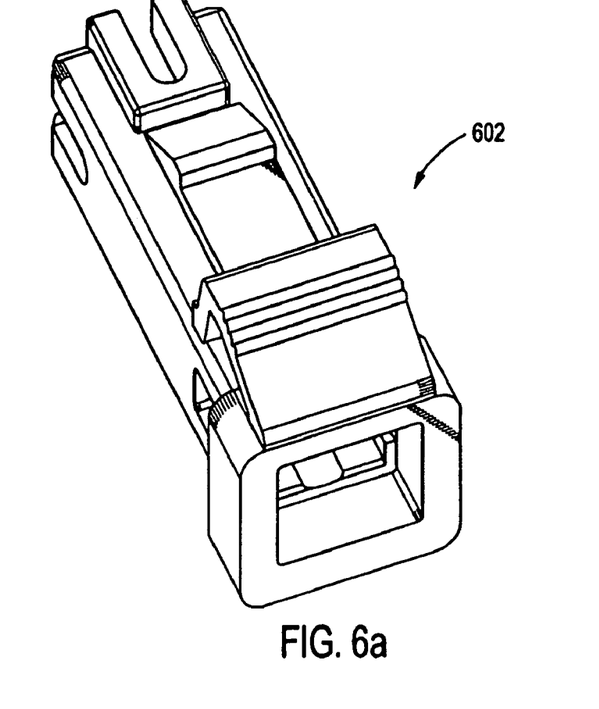
FIGS. 6(a)–6(c) show top perspective, front and rear views, respectively, of an MT-RJ connector plug having security features of the present invention.
Figure 6B:
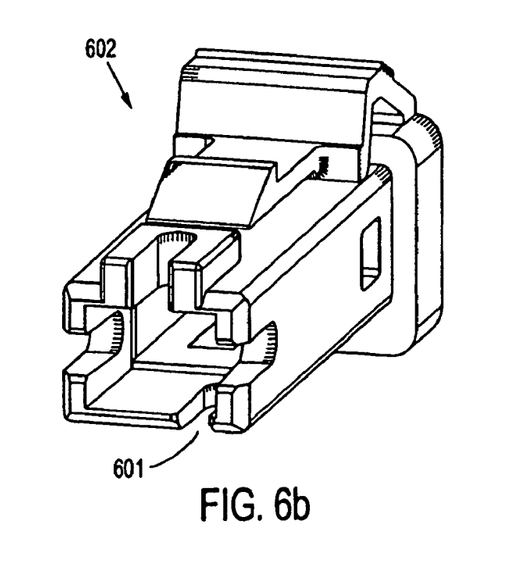
Figure 6C:
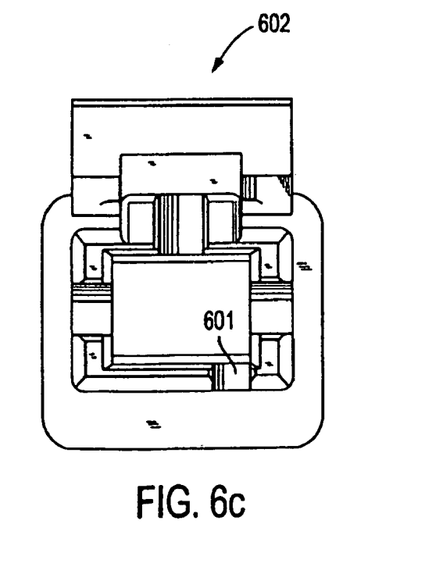
Figure 7A:
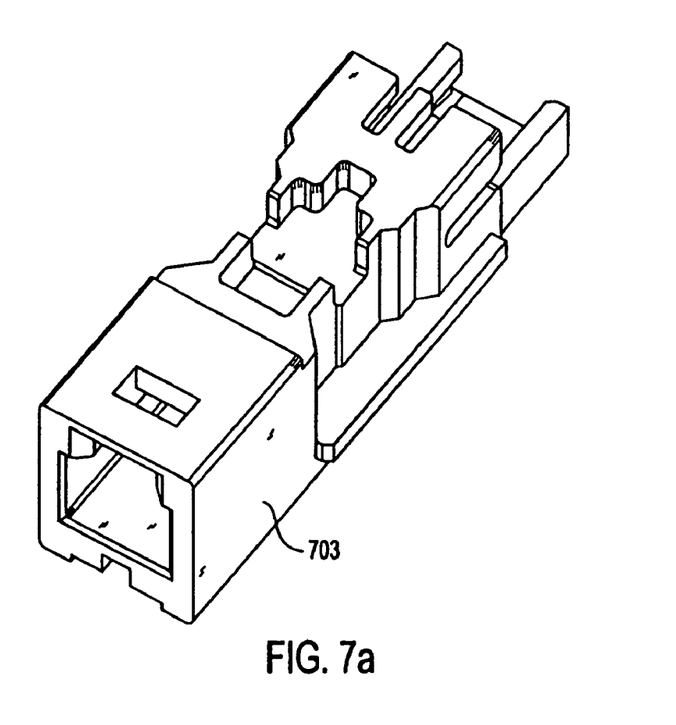
FIGS. 7(a) and 7(b) show top perspective and front views, respectively, of an MT-RJ connector receptacle.
Figure 7B:
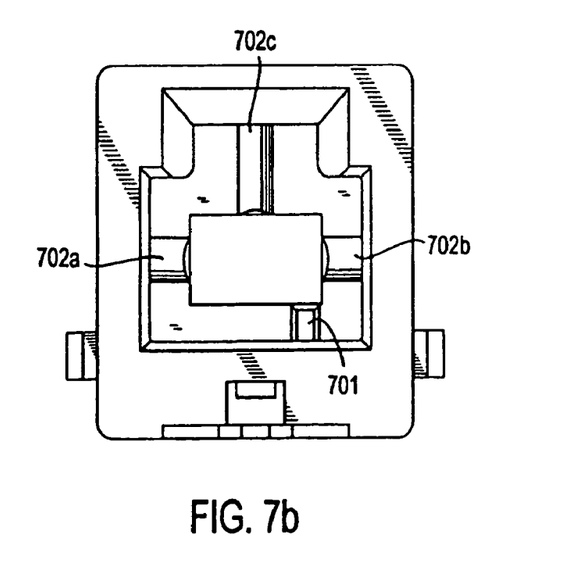

The above-described synergistic keying and aligning feature of the present invention is realized with the MT-RJ connector (Tyco Electronics, Harrisburg, Pa.) as depicted in FIGS. 6(a)–(c). As shown, the plug 602 of the MT-RJ connector has a slot 601 in a particular position. FIGS. 7(a) and 7(b) show an MT-RJ receptacle or connector jack 704 having a tub portion 703. The key 701 is located in one of a plurality of possible positions in the tub portion 703, and three pre-alignment ribs 702a, 702b and 702c protrude from the inner surface 705 of the tub 703. The key 701 functions as the discriminating member for allowing or preventing mating with a plurality of plugs, while also functioning as a pre-alignment member along with ribs 702a, 702b, and 702c.

Figure 8A:
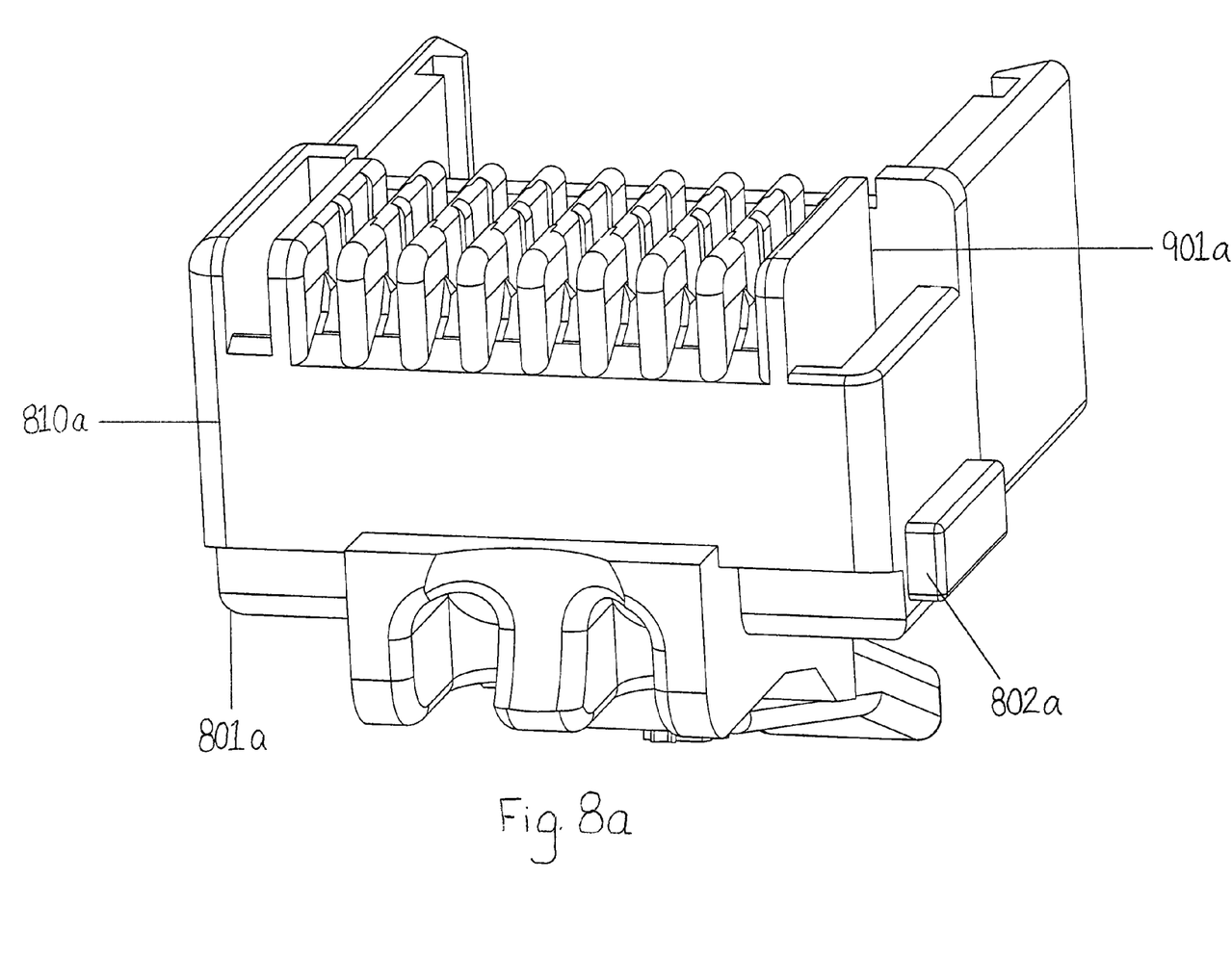
FIGS. 8(a) and 8(b) show front perspective views of two RJ-45 plugs having two different key positions.

Referring to FIGS. 8(a) & (b) and 9(a) & (b), exemplary plugs and receptacles of the connector system 800 of the second configuration are shown, respectively. Referring to FIGS. 9(a) and (b), each receptacle 1001a, 1001b has an inner surface 1002a, 1002b with a first geometry. The first geometry of receptacle 1001a comprises at least one slot 1003a in one position and the first geometry of receptacle 1001b comprises at least one slot 1003b in a different position. Thus, at least two receptacles of system 800 have different first geometries in which the slots are in different positions. In this particular embodiment, the slots are in two different positions, although the invention is not limited to two. For example, it may be preferable to use the space below slots 1003a, 1003b as an additional slot position. (The receptacle embodiments shown in FIGS. 9(a) and (b) use this space to accommodate a tab of a grounding shield which wraps around the receptacle 1001a, 1001b to hold the shield in place.)

Figure 8B:
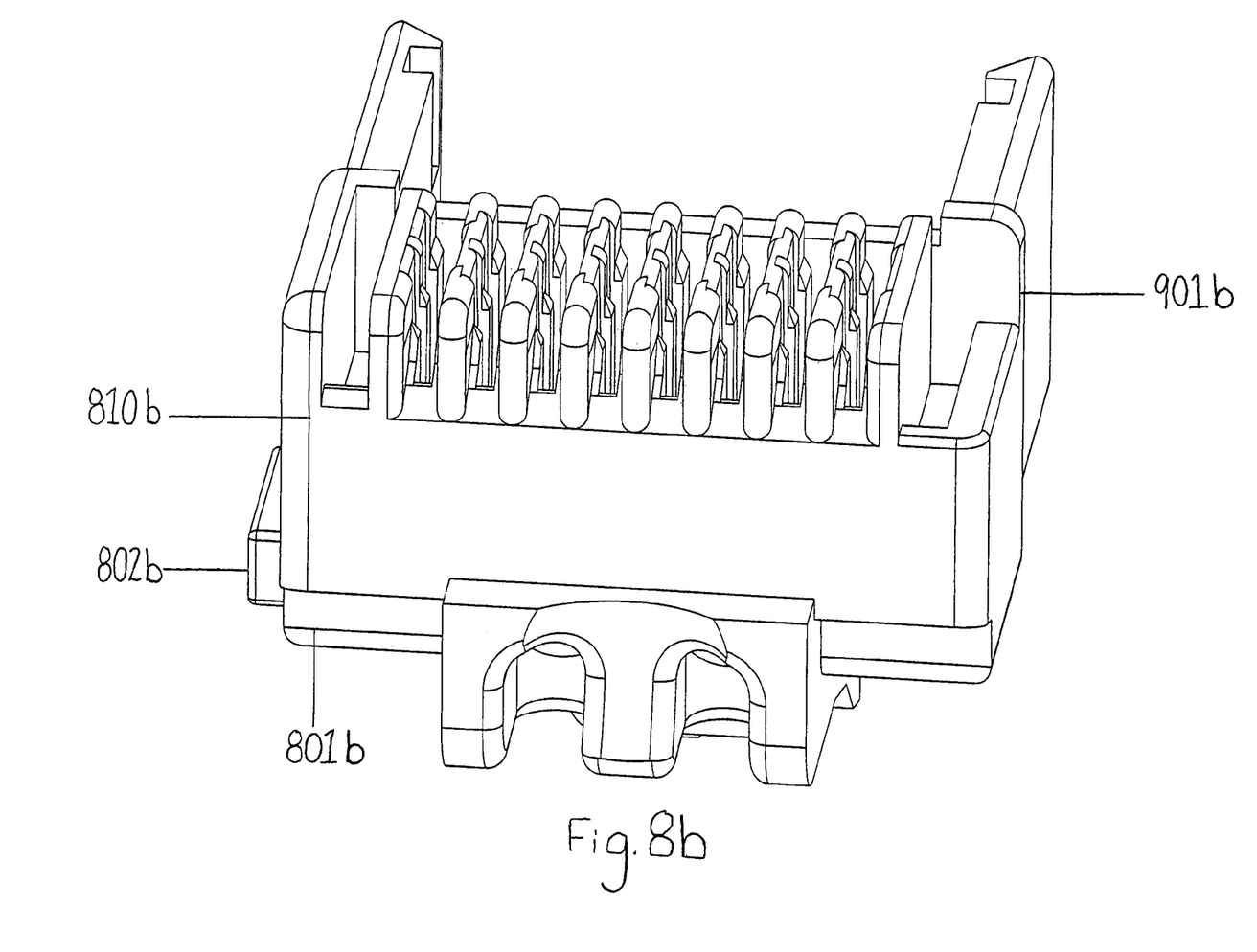
Figure 9A:
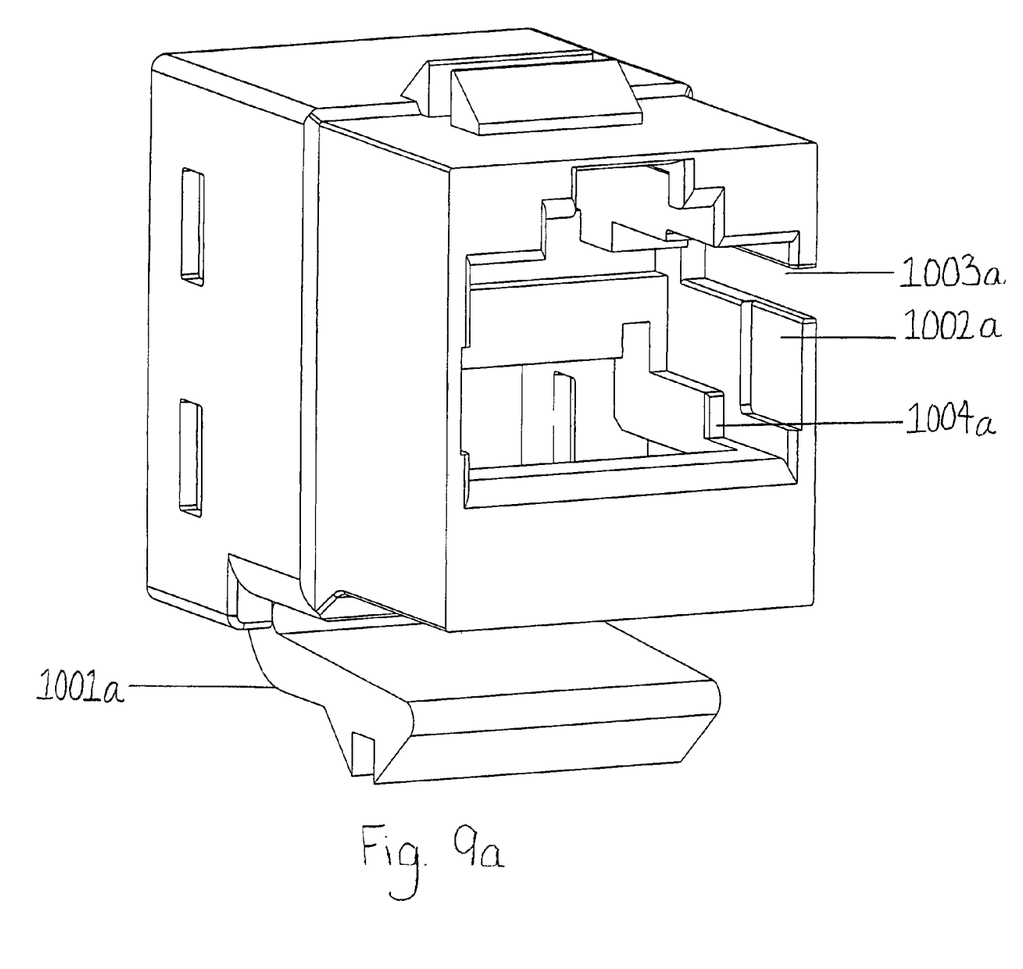
FIGS. 9(a) and 9(b) show perspective views of two RJ-45 jacks having two different slot positions.

The connector system 800 also comprises a plurality of plugs, two of which 801a, 801b are shown in FIGS. 8(a) & 8(b), respectively. Each plug 801a, 801b defines a second geometry which comprises at least a key 802a, 802b in one of a number of positions, which, in this embodiment, is two. There is a one-to-one correspondence between the plugs and receptacles such that each plug 801a, 801b mates with one and only one receptacle 1001a, 1001b, respectively. Likewise, in a preferred embodiment, each receptacle 1001a, 1001b mates with one and only one plug 801a, 801b, respectively.

The plugs 801a, 801b and receptacles 1001a, 1001b in this particular embodiment are RJ-type connectors—more specifically, RJ-45 connectors. Aside from the keying features described herein, these connector components are the same as those specified in the RJ Standard and the common features between them will not be addressed herein.

Figure 9B:
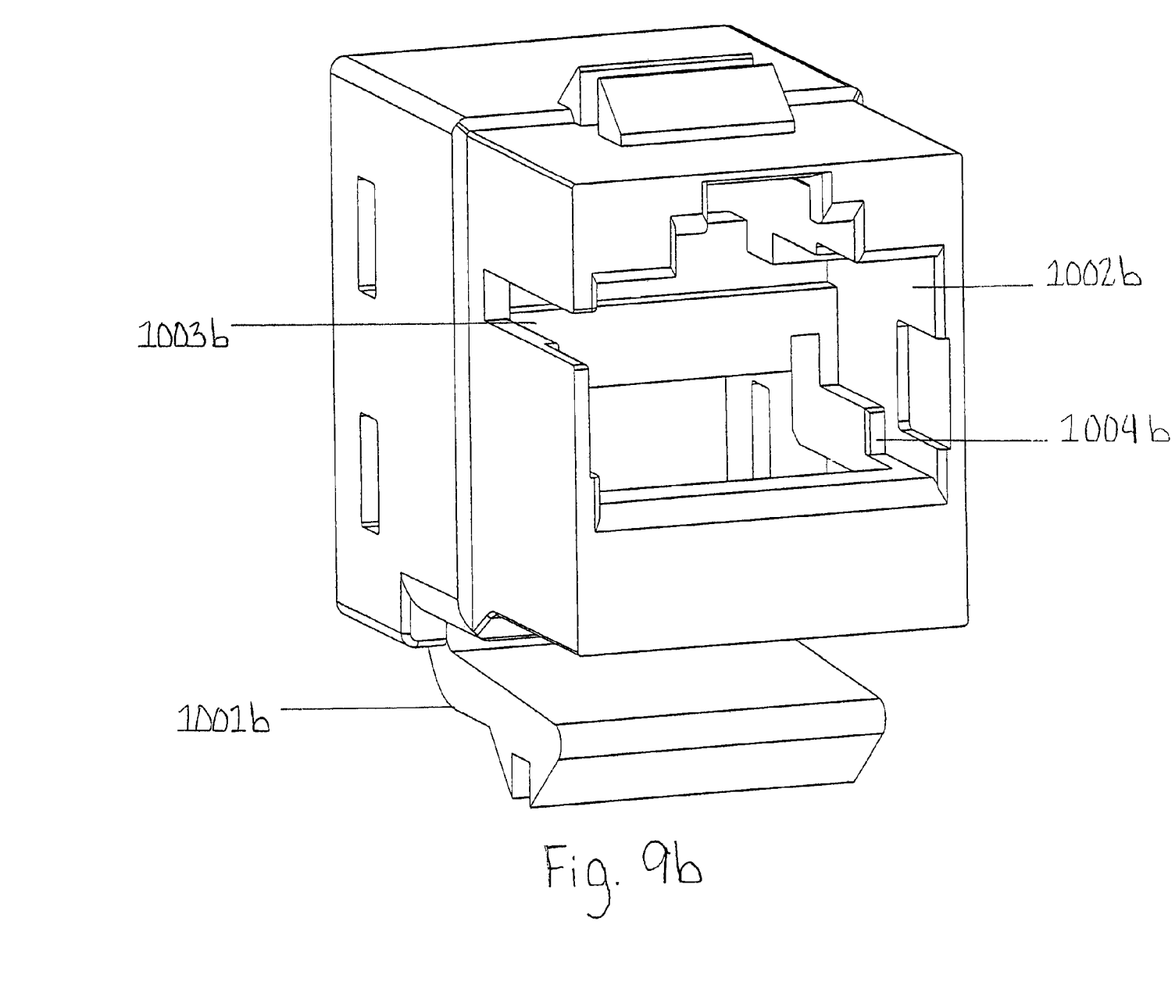

A connector system having the second configuration offers certain benefits, but also presents certain challenges. One benefit is that the space consuming security feature—i.e., the slot 1003a, 1003b—resides in the receptacle which typically is larger than the plug and better suited for accommodating this feature. Additionally, it may be preferable to have one "master" plug which plugs into all receptacles having security features. This is easily accomplished with a connector system of the second configuration. Specifically, the master plug would simply be one having no key to interfere with the first geometry of the receptacle. The simplicity in offering a master plug in the connector system of the second configuration also gives rise to a challenge facing the system—the ability of non-secure plugs to mate with secure receptacles.

To discriminate between secure and non-secure connector systems, the present invention provides for a secondary key & slot configuration, which is either non-existent or in a different position for all plugs and receptacles which are outside of the given connector system 800. For example, referring to FIGS. 9(a) & (b), the first geometry comprises a secondary slot 1004a, 1004b, respectively, which is shown in the same relative position for both receptacles, but which may be in different positions as discussed below. Referring to FIGS. 8(a) and 8(b), the second geometry of the plug 801a, 801b comprises a secondary key 901a, 901b, respectively. The secondary slots 1004a, 1004b are adapted to receive secondary keys 901a, 901b respectively. This way, only plugs and receptacles of a given secure system having accommodating secondary keys/slots will mate.

In a preferred embodiment, at least a portion of the key is disposed in the receptacle. As mentioned above with respect to the first configuration of the connector system, if the physical barrier—i.e., the key—is located on the receptacle, then it interferes with all structures other than those having accommodating slots. Thus, for the same reason, the first configuration is preferable for discriminating among different connector systems, having the secondary key on the receptacle may be preferable for discriminating among different connectors within a system or among different connector systems. In an even more preferred embodiment, the key is located toward the opening of the receptacle, as keys 1004a, 1004b are situated. This way, the key "stubs" or contacts the plug before the conductors of the plug and receptacle make contact.

It is worthwhile to note that the use of the secondary key/slot adds another security feature to the connector system—essentially another keying mechanism. This additional keying feature increases the number of permutations within a given connector system. That is, rather than maintaining the same secondary key and slot location for all connectors within a system, it can be moved to form different classes within the same family. For example, if there are two positions available for the primary key/slot and two positions available for the secondary key/slot, then there are 12 permutations of mating connectors. More specifically, referring to the matrix below, if the primary keying system (e.g., key 802a and slot 1003a) have a $1^{st}$ and $2^{nd}$ positions, and the secondary keying system (e.g., key 1004a, and slot 901a) have $1^{st}$ and $2^{nd}$ positions, then a total of 16 unique mating plugs/receptacle pairs can be produced. However, the mating plug/receptacle pair having no security features (no. 16) offers no physical barriers to connection, and the pairs having no secondary key/slot (nos. 13–16) provide no physical barriers to prevent a non-secure plug from mating with a secure receptacle. Therefore, this leaves 12 possible mating pairs.

| | | Primary Keying | | | |
|---|---|---|---|---|---|
| | | $1^{st}$ position | $2^{nd}$ position | $1^{st}$ and $2^{nd}$ positions | None |
| Secondary Keying | $1^{st}$ position | 1 | 2 | 3 | 4 |
| | $2^{nd}$ position | 5 | 6 | 7 | 8 |
| | $1^{st}$ and $2^{nd}$ positions | 9 | 10 | 11 | 12 |
| | None | 13 | 14 | 15 | 16 |

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. In a family of electrical connectors comprising a standard plug and a standard receptacle, a secure connector system for providing discriminating mating among said connectors, said secure system comprising:
    a plurality of different secure receptacles for facilitating an electrical connection to different information networks requiring different access authorization, each secure receptacle having an inner surface with a first geometry, said first geometry comprising at least a primary slot and a secondary key, said secure receptacles differing physically from each other only in the position of at least their primary slots or secondary key, each secure receptacle differing physically from a standard receptacle only in the existence of both its primary slot and secondary key; and
    a plurality of different secure plugs for coupling with said different secure receptacles, each secure plug having a second geometry, said second geometry comprising at least a primary key and a secondary slot, said secure differing physically from each other only in the position of at least their primary key or secondary slot, each secure plug differing physically from a standard plug only in the existences of both its primary key and secondary slot, each different first geometry corresponding to one and only one second geometry such that the secure plugs and receptacles of corresponding first and second geometries are mating pairs.

2. The secure connector system of claim 1, wherein each plug and receptacle of a mating pair is marked with a matching visual identification different from plugs and receptacles having different first and second geometries, said visual identification being at least one of color, alphanumerical, or symbol.

3. The secure connector system of claim 1, wherein said secure plugs and receptacles form at least four mating pairs.

4. The secure connector systems of claim 3, wherein the four mating pairs are color coded red, yellow, blue, and green.

5. The secure connector system of claim 1, wherein said family of connectors comprises RJ-type connectors.

6. The secure connector system of claim 5, wherein said family of connectors comprises RJ-45 connectors.

7. The secure connector system of claim 1, wherein said primary positions are different, and said secondary positions are the same.

8. The secure connector system of claim 1, wherein a portion of said primary positions are the same, and a portion of said secondary positions are different.

9. In a family of electrical connectors comprising a standard plug and a standard receptacle, a secure connector system for providing discriminating mating among said connectors, said secure connector system comprising:
    at least a first plug and a second plug, said first plug comprising a first primary key in a first primary position and a first secondary slot in a first secondary position, said second plug comprising a second primary key in a second primary position and a second secondary slot in a second secondary position, said first and second plugs differing physically only in the position or at least their primary slot or secondary key, each secure plug differing physically from a standard plug in the existences of both its primary key and secondary slot;
    wherein said first plug is configured to mate with a first receptacle, said first receptacle having a first primary slot in a first primary position and a first secondary key in a first secondary position, said first primary slot adapted to receive said first primary key and said first secondary slot adapted to receive said first secondary key to allow said first plug to mate with said first receptacle to form a mating pair;
    wherein said second plug is configured to mate with a second receptacle, said second receptacle having a second primary slot in a second primary position and a second secondary key in a second secondary position, said second primary slot being adapted to receive said second primary key and said second secondary slot being adapted to receive said second secondary key to allow said second plug to mate with said second receptacle to form a mating pair; and
    wherein at least one of said first primary key interferes with said second receptacle or said second secondary key interferes with said first plug to prevent said first plug from mating with said second receptacle;
    wherein at least one of said second primary key interferes with said first receptacle or said first secondary key interferes with said second plug to prevent said second plug from mating with said first receptacle; and
    wherein said first and second primary keys interfere with said standard receptacle to prevent said first and second plugs from mating with said standard receptacle.

10. The secure connector system of claim 9, further comprising said first and second receptacles, wherein said secondary keys of said first and second receptacles interfere with said standard plug to prevent said first and second optical receptacles from mating with said standard plugs.

11. The secure connector system of claim 10, further comprising a universal plug having no primary key to interfere with said first and second receptacles.

12. The secure connector system of claim 10, further comprising:
    third, fourth and fifth plugs having a third, fourth and fifth key in a third, fourth, and fifth primary positions, respectively, said third, fourth and fifth electrical plugs having a third, fourth and fifth secondary key in a third, fourth, and fifth secondary position, respectively, said first, second, third, fourth and fifth plugs physically differing from each other only in the position of at least their primary key or secondary slot, said first, second, third, fourth and fifth plugs physically differing from said standard plug in the existence of their primary key and secondary slot;
    third, fourth and fifth receptacles having a third, fourth and fifth primary slot in a third, fourth and fifth primary position, respectively, said third, fourth and fifth receptacles having a third, fourth and fifth secondary key in a third, fourth and fifth secondary position, respectively, said first, second, third, fourth and fifth receptacles physically differing from each other only in the position of at least their primary slot or secondary key, said first, second, third, fourth and fifth receptacles physically differing from said standard receptacle only in the existence of their primary slot and secondary key;

wherein said third, fourth and fifth primary slots are adapted to receive said third, fourth and fifth primary keys, respectively, and said third, fourth and fifth secondary slots are adapted to receive said third, fourth and fifth secondary keys, respectively, to allow said third, fourth and fifth plugs to mate with only said third, fourth and fifth receptacles, respectively;

wherein said third, fourth and fifth secondary keys of said third, fourth and fifth receptacles interfere with said standard plug to prevent said third, fourth and fifth receptacles from mating with said standard plug.

13. The secure connector system of claim 12, wherein each of said first, second, third, fourth and fifth primary positions are different, and said first, second, third, fourth and fifth secondary positions are the same.

14. The secure connector system of claim 12, wherein each of said first, second, third, fourth and fifth primary positions are the same, and said first, second, third, fourth and fifth secondary positions are different.

15. The secure connector system of claim 9, wherein said first and second secondary positions are the same.

16. The secure connector system of claim 9, wherein said first and second secondary positions are different.

17. The secure connector system of claim 9, wherein each mating pair is marked with matching visual identification which is unique among the different mating pairs, said visual identification being at least one of color, alphanumerical, or symbol.

18. The secure connector system of claim 9, wherein said secondary keys are located inside said secure receptacles.

* * * * *